(12) United States Patent
Rohee

(10) Patent No.: US 7,140,686 B2
(45) Date of Patent: Nov. 28, 2006

(54) VEHICLE SEAT ARTICULATION MECHANISM AND SEAT COMPRISING SUCH A MECHANISM

(75) Inventor: René Rohee, La Chapelle Biche (FR)

(73) Assignee: Faurecia Sieges d'Automobile S.A., Nanterre (FR)

( * ) Notice: Subject to any disclaimer, the term of this patent is extended or adjusted under 35 U.S.C. 154(b) by 0 days.

(21) Appl. No.: 11/159,732

(22) Filed: Jun. 23, 2005

(65) Prior Publication Data

US 2006/0006716 A1    Jan. 12, 2006

(30) Foreign Application Priority Data

Jun. 24, 2004  (FR)  ................... 04 06926

(51) Int. Cl.
 *B60N 2/02* (2006.01)
(52) U.S. Cl. .................................... 297/366
(58) Field of Classification Search ........... 16/223, 16/235, 239, 366, 367, 368, 369, 362
See application file for complete search history.

(56) References Cited

U.S. PATENT DOCUMENTS

| 4,505,515 A | * | 3/1985 | Wilking et al. ............ 297/362 |
| 4,634,181 A | | 1/1987 | Pipon |
| 5,531,504 A | * | 7/1996 | Schmale et al. ........... 297/362 |
| 5,779,313 A | * | 7/1998 | Rohee ....................... 297/367 |
| 6,328,383 B1 | * | 12/2001 | Rohee et al. ............... 297/367 |
| 6,669,296 B1 | * | 12/2003 | Moriyama et al. .......... 297/367 |
| 6,669,297 B1 | * | 12/2003 | Cilliere et al. ............. 297/367 |
| 6,715,835 B1 | * | 4/2004 | Hoshihara et al. ......... 297/366 |
| 2002/0041119 A1 | | 4/2002 | Kojima et al. |
| 2003/0067205 A1 | | 4/2003 | Eppert et al. |
| 2003/0178879 A1 | | 9/2003 | Uramichi |
| 2003/0230923 A1 | | 12/2003 | Uramichi |
| 2004/0113475 A1 | | 6/2004 | Uramichi et al. |

FOREIGN PATENT DOCUMENTS

| EP | 1225085 A2 | 7/2002 |
| FR | 2578601 | 9/1986 |
| FR | 2578602 | 9/1986 |

OTHER PUBLICATIONS

French Preliminary Search Report dated Mar. 31, 2005 for parallel French Patent Application No. 0406926.

* cited by examiner

*Primary Examiner*—Milton Nelson, Jr.
(74) *Attorney, Agent, or Firm*—Marshall, Gerstein & Borun LLP

(57) ABSTRACT

Vehicle seat articulation mechanism intended to connect two elements belonging to the seat, the articulation mechanism comprising first and second rigid cheek plates extending in parallel planes and intended to be attached respectively to the two seat elements, and an adjustment mechanism connecting the first and second cheek plates and suitable for allowing a relative angular adjustment between the said cheek plates. The first cheek plate is trapped against the second cheek plate by at least one rigid annular gusset which is welded against the inner face of the second cheek plate.

15 Claims, 7 Drawing Sheets

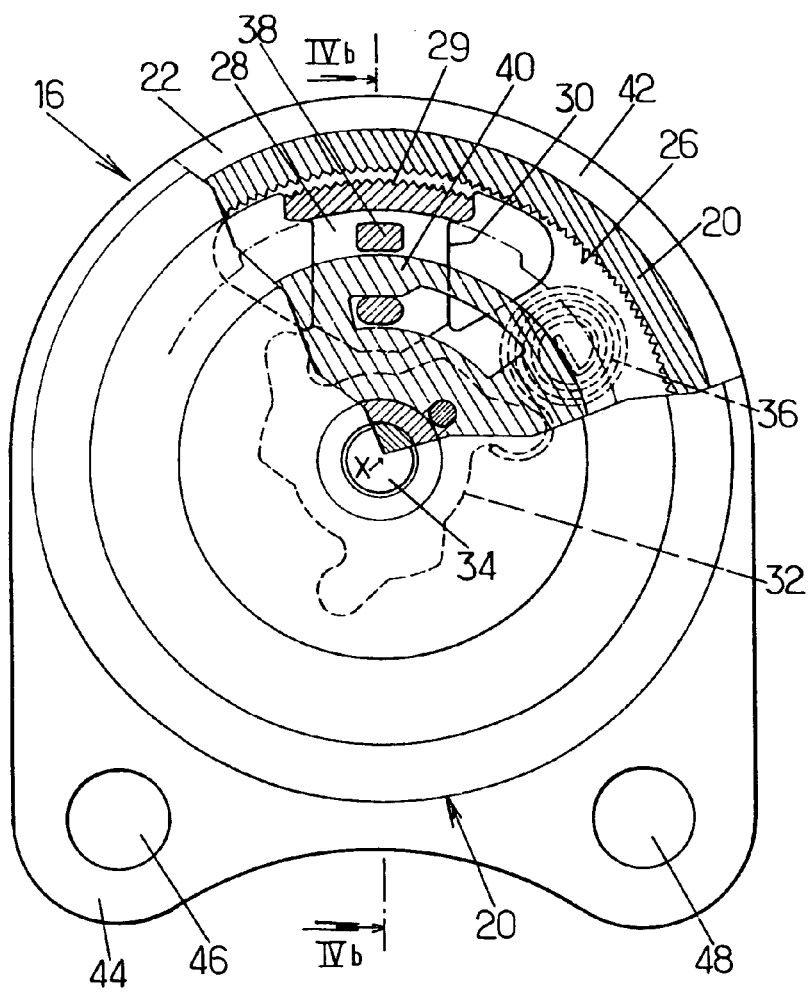
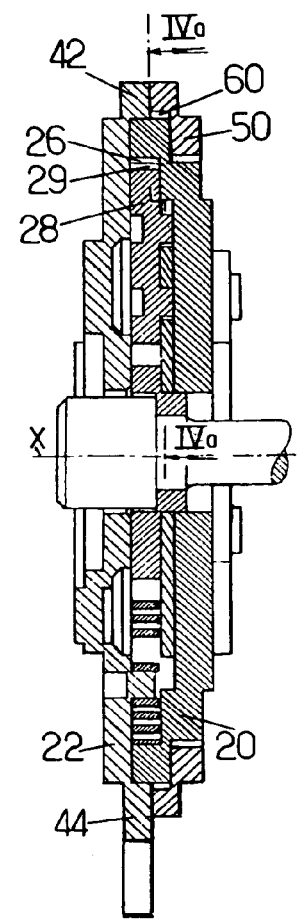
FIG.4a.
FIG.4b.

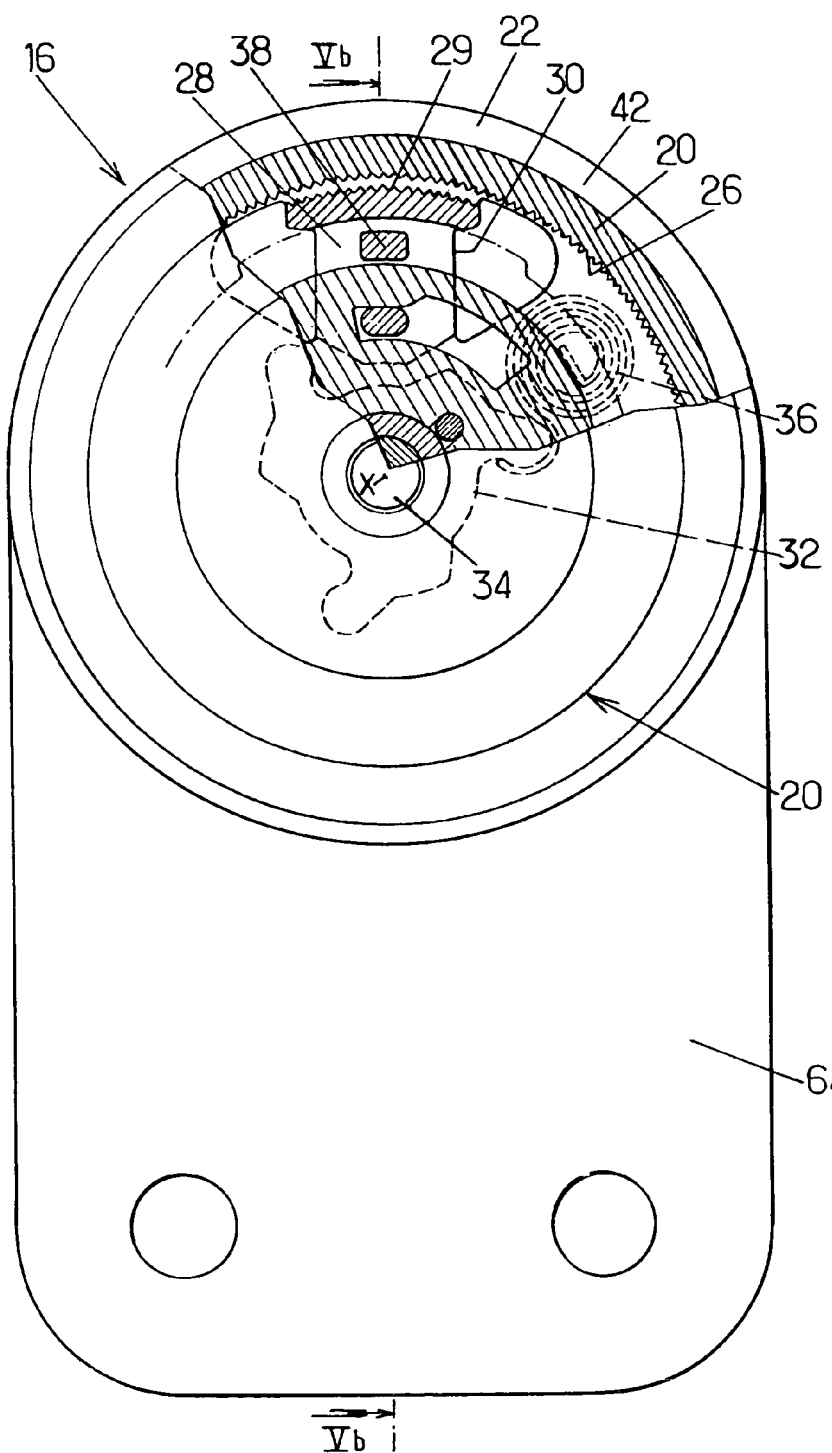
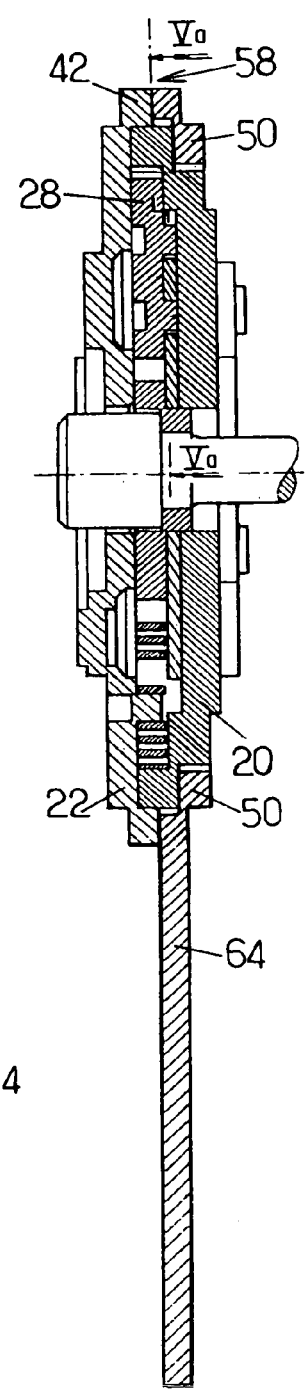
FIG.5a.
FIG.5b.

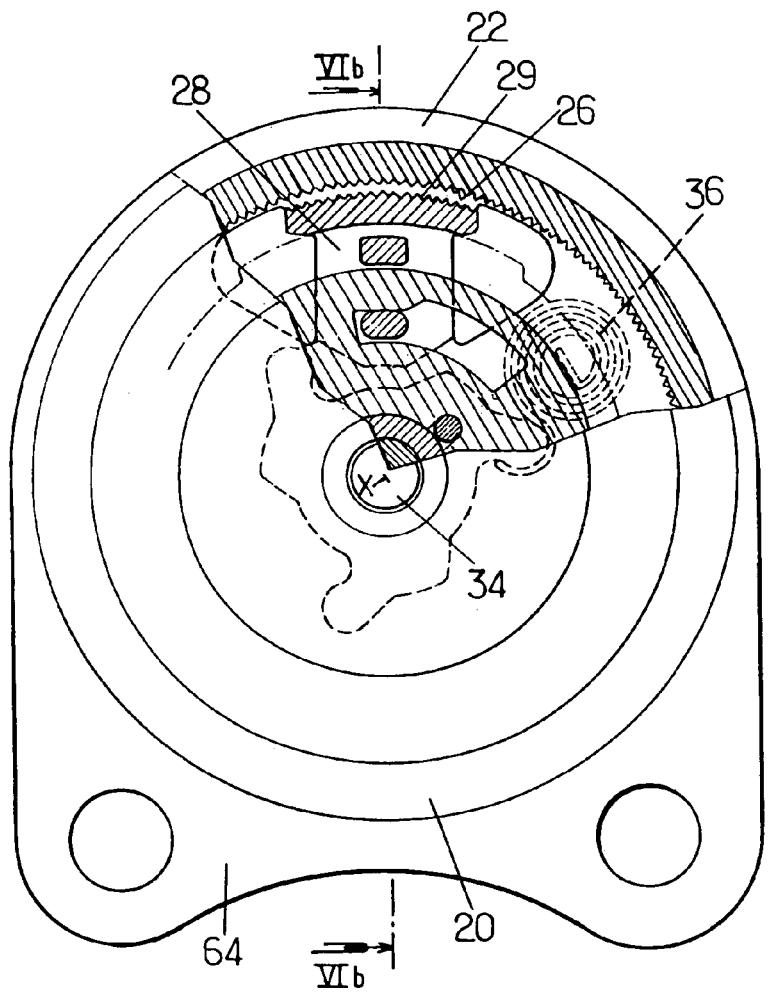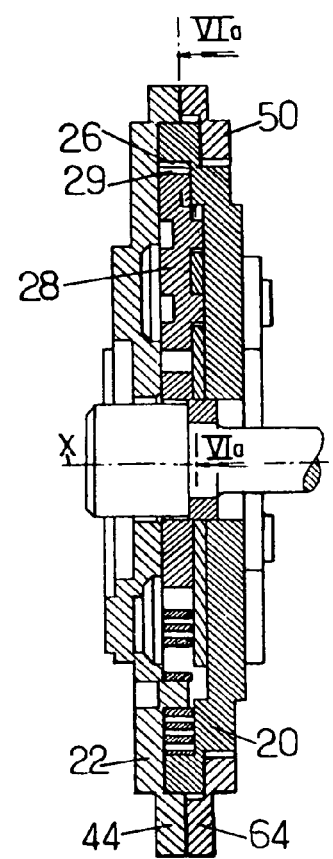
FIG.6a.
FIG.6b.

VEHICLE SEAT ARTICULATION MECHANISM AND SEAT COMPRISING SUCH A MECHANISM

FIELD OF THE INVENTION

The present invention relates to articulation mechanisms and seats comprising such mechanisms.

More particularly, the invention relates to a vehicle seat articulation mechanism intended to connect two elements belonging to the seat, the said articulation mechanism comprising:

first and second rigid cheek plates extending in parallel planes and intended to be attached respectively to the two seat elements, each of the first and second cheek plates comprising an inner face oriented towards the other of the first and second cheek plates and an outer face oriented opposite the inner face, a rigid annular gusset welded to the second cheek plate and trapping the first cheek plate against the second cheek plate, and an adjustment mechanism connecting the first and second cheek plates and suitable for allowing a relative angular adjustment between the said cheek plates.

BACKGROUND OF THE INVENTION

Document DE-A-101 05 282 describes a seat furnished with an articulation mechanism of the type detailed hereinabove, in which the gusset is welded to the second cheek plate by means of a fitted metal sheet which makes the assembly of the mechanism complex, costly and unreliable.

The main objective of the present invention is to remedy these disadvantages.

SUMMARY OF THE INVENTION

As a result, according to the invention, a mechanism of the kind in question is characterized in that the gusset is superposed on the inner face of the second cheek plate and welded against the said inner face of the second cheek plate, without covering the outer face of the second cheek plate.

Thanks to these arrangements, the gusset is attached to the second cheek plate simply, reliably and at low cost.

In various embodiments of the mechanism according to the invention, it is possible where necessary to also use one and/or the other of the following dispositions:

the gusset is a metal piece more than 2 mm thick, the gusset and the second cheek plate are suitable for guiding the first cheek plate in rotation, the gusset comprises a flange which extends in a plane parallel to the cheek plates, the first cheek plate is generally disc-shaped, the second cheek plate comprises a disc-shaped portion, the second cheek plate also comprises a flange which extends in a plane parallel to the disc-shaped portion, the adjustment mechanism is suitable for selectively either immobilizing or releasing the first and second cheek plates in rotation, according to the actuation of a control member, the adjustment mechanism comprises at least one gear connecting the first and second cheek plates together, the said gear being controlled by an input member and being suitable for positively causing a rotation between the first and second cheek plates when the input member is actuated, the articulation mechanism comprises a set of gear teeth oriented radially inwards and placed opposite a corresponding surface of the first cheek plate, the first cheek plate comprises on the said corresponding surface a set of gear teeth directed radially outwards and interacting with the set of gear teeth of the gusset, the gear connecting the first and second cheek plates together is made by means of a planet gear, the gusset comprises at least one abutment interacting with the first cheek plate to limit the relative angular movement of the first and second cheek plates, the articulation mechanism also comprises a piece made of rigid plastic covering the body of the second cheek plate and one of the flanges, Furthermore, the invention also has as its subject a vehicle seat comprising a seat part and a back mounted mobile in rotation relative to one another by means of at least one mechanism according to the description hereinabove.

BRIEF DESCRIPTION OF THE DRAWINGS

Other features and advantages of the invention will appear during the following description of several of its embodiments, given as non-limiting examples, with respect to the attached drawings.

In the drawings:

FIG. 4a represents a view similar to FIG. 2a of the second embodiment of the invention, FIG. 4b represents a view similar to FIG. 2b of the second embodiment, FIG. 5a represents a view similar to FIG. 2a according to a third embodiment of the invention, FIG. 5b represents a view similar to FIG. 2b according to the third embodiment, FIG. 6a represents a view similar to FIG. 2a according to a fourth embodiment of the invention, FIG. 6b represents a view similar to FIG. 2b according to the fourth embodiment.

DETAILED DESCRIPTION OF THE PREFERRED EMBODIMENTS

In the various figures, the same reference numbers indicate identical or similar elements.

Figure 1:
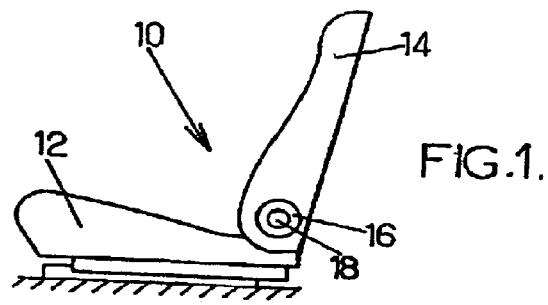
FIG. 1 represents a vehicle seat that can be fitted with an articulation mechanism according to the invention.

FIG. 1 represents a motor vehicle seat 10, for example a front seat, which comprises a seat part 12 mounted on the floor of the vehicle, for example by means of slides. The seat also comprises a back 14 which is mounted pivotably on the seat part 12 around a horizontal transversal axis X, by means of at least one articulation mechanism 16 controlled for example by a rotary handle 18.

With particular reference to FIGS. 2, 3a and 3b, in which an articulation is shown in greater detail, it can be seen that the articulation mechanism 16 comprises first and second support members which may for example have the shape of two cheek plates 20, 22 made of steel sheet placed one against the other perpendicular to the transversal axis X of the vehicle and which may be connected respectively to the brace of the back 14 and to the brace of the seat part 12.

More particularly, the first cheek plate 20, hereinafter called the mobile cheek plate, made of steel sheet, may have a generally circular shape perpendicular to the axis of rotation X. The second cheek plate 22 made of steel sheet, hereinafter called the fixed cheek plate, may comprise at least one portion of circular shape, placed perpendicular to the axis X, and having an annular edge 42 with an inner face, oriented towards the interior of the articulation, and an outer face oriented towards the exterior of the articulation. The first and second cheek plates 20, 22 are mounted pivoting one relative to the other about the axis X.

The articulation mechanism 16 also comprises an adjustment mechanism connecting the fixed cheek plate 20 and the mobile cheek plate 22 together.

In a first variant embodiment of the invention, represented in FIGS. 2 to 6, the adjustment mechanism is a follower-based latching device, comprising for example:

a set of gear teeth 26, internal for example, fixedly attached to the mobile cheek plate 20, centered on the transversal axis X and in this instance made in a single piece with the mobile cheek plate 20.

It also comprises one or more followers 28 each supporting a set of gear teeth 29 oriented radially outwards, each follower 28 being mounted mobile relative to the fixed follower plate 22 between:

a latched position in which the set of gear teeth 29 of this follower 28 engages with the set of gear teeth 26 of the mobile cheek plate 20, and an unlatched position in which the set of gear teeth 29 of the follower 28 is not engaged with the set of gear teeth 26 of the mobile cheek plate 20; in the example considered here, each follower 28 is mounted sliding radially in guides 30 made in a single piece with the fixed cheek plate 22.

It also comprises a cam controlled device, comprising, on the one hand, a cam 32 fixedly attached to a control shaft 34 attached to the handle 18, and where appropriate a control plate 40 fixedly attached to the cam 32. The cam 32 is operated elastically, via one or more springs 36, towards a rest position in which the said cam 32 pushes away the follower or followers 28 radially outwards to their latched position, and the control plate 40 comprises an internal cut-out opposite each follower 28, a cut-out in which a pin 38, belonging to the corresponding follower 28, is engaged the outer edge of the cut-out being formed so as to act on the pin 38 by moving the corresponding follower 28 to its unlatched position when the handle 18 is actuated.

Figure 2A:
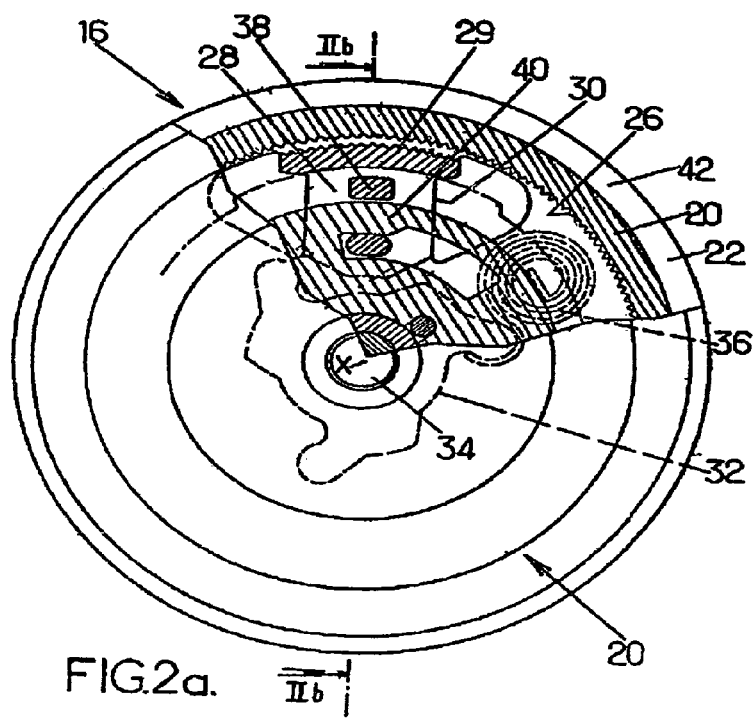
FIG. 2a represents a side sectional view in partial section along the line IIa—IIa of FIG. 2b.
Figure 2B:
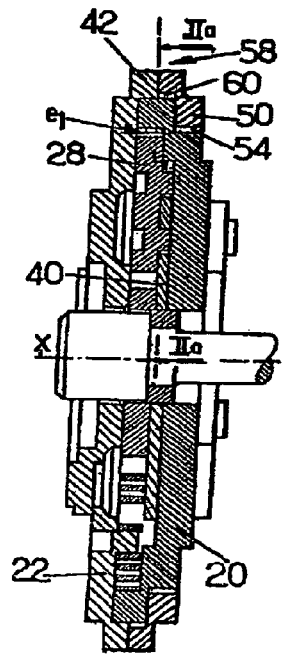
FIG. 2b represents a view in section along the line IIb—IIb of FIG. 2a, FIG. 3 represents a view in perspective of a second embodiment of the articulation mechanism.

In FIG. 2b which is a view in longitudinal section along the axis IIb—IIb of FIG. 2a, it can be seen that the mobile cheek plate 20 and the fixed cheek plate 22 are kept adjacent to one another.

The articulation mechanism also comprises a gusset 50 fitted onto the fixed cheek plate 22, and which traps the mobile cheek plate 20 against the fixed cheek plate 22. The gusset 50 is made of a material such as steel sheet whose thickness varies between 2 and 4 mm and even thicker.

The gusset 50 has the shape of a closed circular rigid ring that is attached permanently to the fixed cheek plate 22. The gusset 50 is placed parallel to the fixed cheek plate 22, in the longitudinal direction Z perpendicular to the transversal axis X. The gusset 50 is superposed on the transversal internal face of the annular edge 42, without covering the external face of the latter.

For this, the gusset 50 has the shape of a ring consisting of two portions offset from one another along the transversal axis X. The gusset 50 comprises a first, so-called lower, portion 54 and a second, so-called upper, portion 53, which is intended to be superposed on the inner face of the annular edge 42 of the fixed cheek plate 22.

The gusset 50 is of annular shape and interacts with the annular edge 42 of the fixed cheek plate 22 to crate the circular housing with a U-shaped profile, directed inwards, and surrounding, over the whole of its perimeter, the mobile cheek plate 20. A space 60 is made between the gusset 50 and the mobile cheek plate 20 so that the mobile cheek plate 20 is guided in rotation only by the set of gear teeth 29 of the followers 28 on a portion of its thickness el.

Each branch of the U-shaped housing is formed respectively by the first lower portion 54 of the gusset 50 and by a first portion of the fixed cheek plate 22. The base 58 of the U-shaped housing is made by assembling the second upper portion 53 of the gusset 50 and the annular edge 42 of the fixed cheek plate 22. The annular edge 42 is offset transversally inwards along the axis X, relative to the first portion of the fixed cheek plate 22. The annular edge 42 is welded to the upper portion 53 of the gusset 50 and absorbs a portion of the forces applied transversally along the axis X to the articulation, thereby increasing its strength. The gusset 50 is of annular shape and interacts with the annular edge 42 of the fixed cheek plate 22 to crate the circular housing with a U-shaped profile, directed inwards, and surrounding, over the whole of its perimeter, the mobile cheek plate 20. A space 60 is made between the gusset 50 and the mobile cheek plate 20 so that the mobile cheek plate 20 is guided in rotation only by the set of gear teeth 29 of the followers 28 on a portion of its thickness el.

Each branch of the U-shaped housing is formed respectively by the first lower portion 54 of the gusset 50 and by a first portion of the fixed cheek plate 22. The base 58 of the U-shaped housing is made by assembling the second upper portion 53 of the gusset 50 and the annular edge 42 of the fixed cheek plate 22. The annular edge 42 is offset transversally inwards along the axis X, relative to the first portion of the fixed cheek plate 22. The annular edge 42 is welded to the upper portion 53 of the gusset 50 and absorbs a portion of the forces applied transversally along the axis X to the articulation, thereby increasing its strength.

The gusset 50 is attached to the fixed cheek plate 22 by an annular weld, for example by laser welding, backside welding or any other method. The weld may be made on the whole circumference of the annular edge 42. It may also be formed of three beads of weld forming an arc of a circle over a limited zone, substantially identical for the three beads. Or the weld may be formed by two beads diametrically opposed and made simultaneously to avoid heat deformations.

Furthermore, the operation of welding the gusset 50 onto the second cheek plate is less complex than the crimping of a fitted ring around the two cheek plates 20, 22. Finally the whole articulation is stronger.

Figure 3:
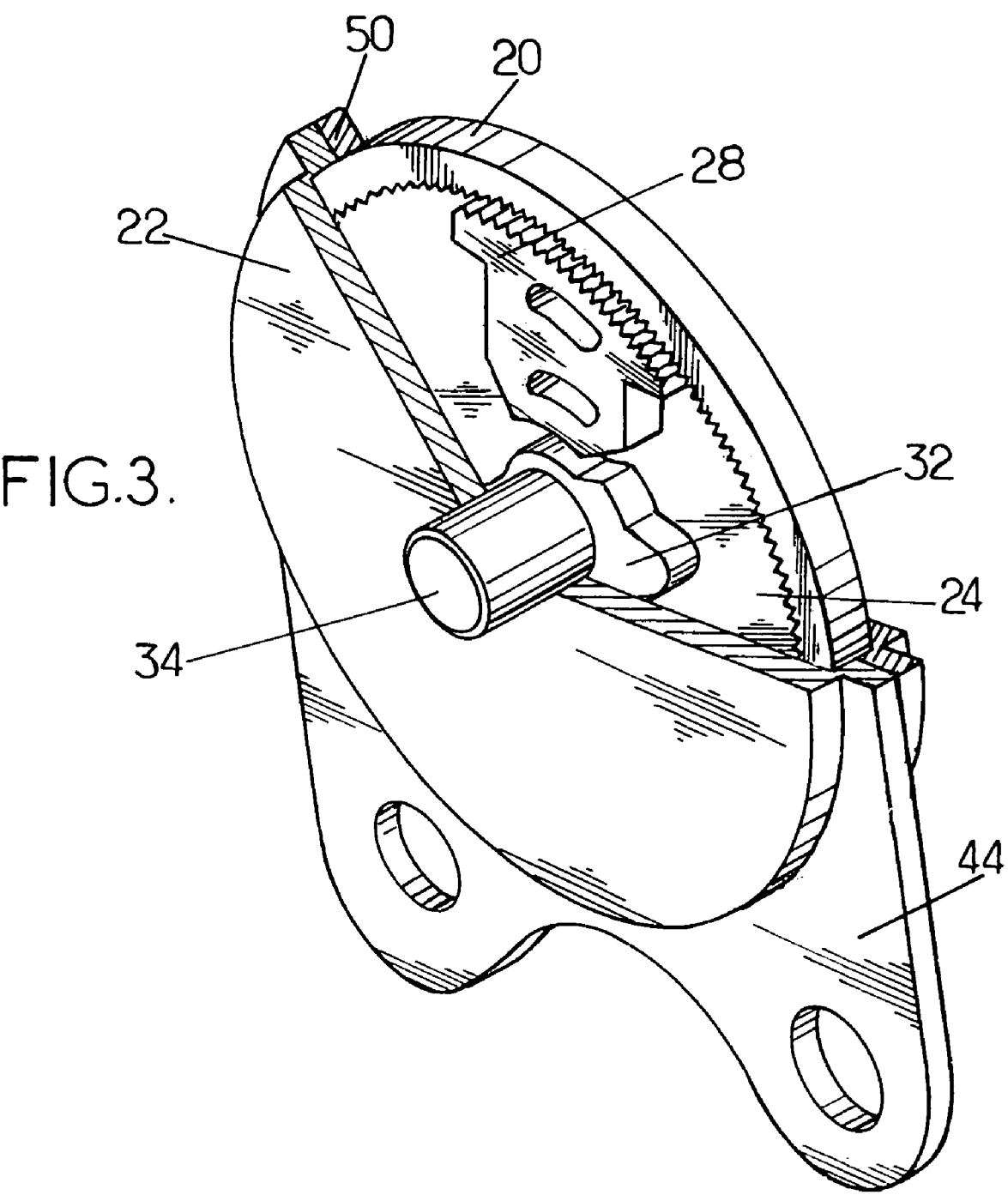

According to another embodiment represented in FIGS. 3, 4a and 4b, the articulation, of the type described in FIGS. 2a and 2b, comprises a fixed cheek plate 22 which comprises a flange 44 intended to be attached to the brace of the seat part.

The flange 44 longitudinally extends the second cheek plate in a direction substantially parallel to the vertical axis Z. This flange 44 is made in a single piece with the disc-shaped portion of the fixed cheek plate 22, and its length is determined such that it can be attached to the brace of the seat part 12 of the seat 10.

As described in the first embodiment, the gusset 50 is fitted onto the annular edge 42 of the fixed cheek plate 22 and is welded to the latter as previously described.

The flange comprises two openings 46, 48 through which means, such as screws, of attachment to the brace of the seat part 12 are inserted. Thus, the flange 44 of the cheek plate 22 is suitable for attaching the latter to the seat part 12, and can be used to obtain an easier assembly or disassembly operation. Specifically the articulation may be mounted onto the back 14 of the seat 10, then the seat and articulation assembly subsequently being brought to the seat part 12 and attached by means of the flange 44 onto the brace of the seat part by screwing. Thus the two portions of the seat 10 may be made independently of one another and mounted during a later operation.

When the articulation 16 is mounted on the seat part, the fixed cheek plate 22 may be covered with seat covering so that the articulation is integrated into the latter, which offers a more aesthetic appearance for the user.

According to a variant, the fixed cheek plate 22 may be covered by a piece of trim made of rigid plastic so that the metal pieces are not visible to the passengers and the driver of the vehicle.

Finally, thanks to the gusset 50 and to the flange 44 of the fixed cheek plate 22, the distance between the fixed cheek plate 22 and the brace of the back 14 of the seat is less than that of the articulations of the prior art, which increases the strength of the articulation particularly during forces directed along the transversal axis X.

In a third embodiment represented in FIGS. 5a and 5b, the gusset comprises a flange 64 formed of a single piece with the circular rigid ring. Thus the articulation is attached to the seat part by means of the flange 64 of the gusset, which allows an attachment that is simplier and less costly to achieve.

Since the ring of the gusset 50 is welded to the fixed cheek plate 22 as described in the first embodiment, the strength of the articulation is improved relative to the forces in the transversal direction X, for example, in the event of a side impact.

According to a fourth embodiment represented in FIGS. 6a and 6b, the gusset 50 and the fixed cheek plate 22 each comprise a flange 44, 64 which are placed opposite one another and superposed on one another and which are intended to be attached to the brace of the seat part. The flange 64 of the gusset 50 is identical to that previously described. It extends substantially parallel to the longitudinal axis Z, in the direction of the seat part 12 of the seat 10, so that it is possible to attach the articulation to the seat part 12. The fixed cheek plate 22 also comprises a flange 44, as previously described, which extends parallel to the vertical axis Z. The two flanges 44, 64 may be placed adjacent and welded to one another, which stiffens the articulation and makes it more resistant in particular to the forces directed along the transversal axis X.

Figure 7A:
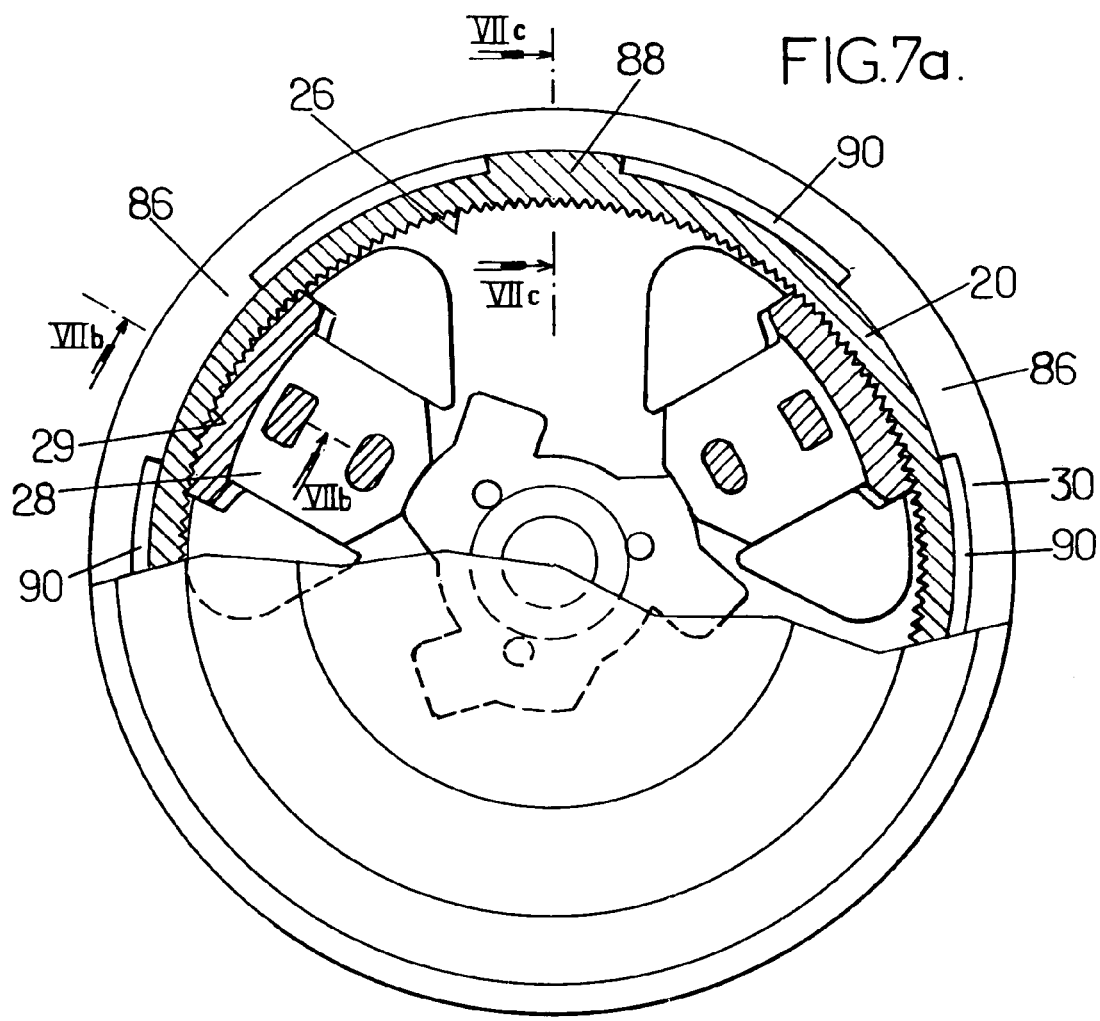
FIG. 7a represents a front view with an exploded portion of the articulation according to a variant of the first embodiment of the invention.
Figure 7B:
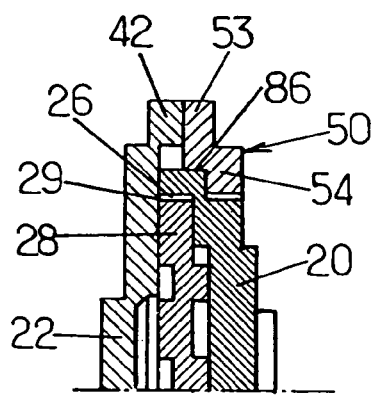
FIGS. 7b and 7c represent views respectively along the lines VIIb—VIIb and VIIc—VIIc of FIG. 7a, FIG. 8a represents respectively a front view of a variant of the first embodiment, in which the first cheek plate has been removed.
Figure 7C:
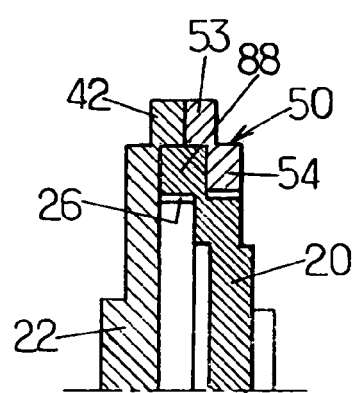

According to another variant of the invention represented in FIGS. 7a, 7b and 7c, the gusset 50 comprises three abutments 86 interacting with a protruding portion 88 formed in the mobile cheek plate 20 to limit the relative angular movement of the mobile cheek plate 20 relative to the fixed cheek plate 22. The three abutments 86 are placed at an angle of 120° from one another, which creates three spaces 90, substantially of the same length, in which the protruding abutments of the mobile cheek plate 20 move.

In FIG. 7b, which is a view in section along VIIb—VIIb of FIG. 7a, the upper portion 53 of the gusset extends parallel to the longitudinal axis Z and inwards, to form the abutment 86. This abutment is placed adjacent to the mobile cheek plate 20. FIG. 7c, which is a view in section along VIIc—VIIc of FIG. 7a, makes it possible to see the protruding portion 88 of the first cheek plate which is moved by rotation between two abutments. This protruding portion is placed adjacent to the annular edge 42 of the second cheek plate and to the upper portion 53 of the gusset 50.

Figure 8A:
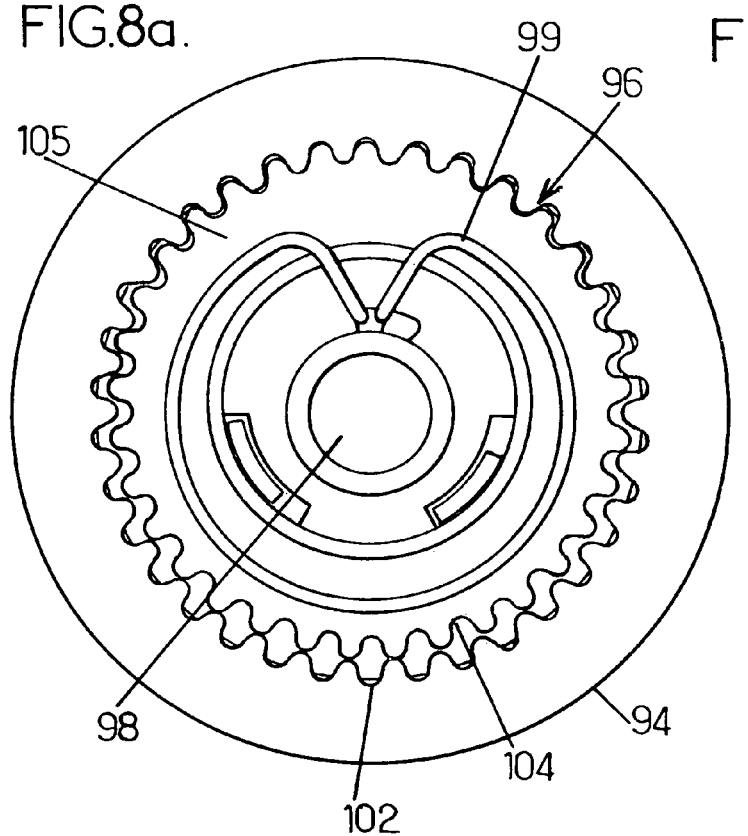
FIG. 8b represents a view in longitudinal section along VIIIb—VIIIb of FIG. 8a, FIG. 8c represents a front view in the direction VIIIc.
Figure 8B:
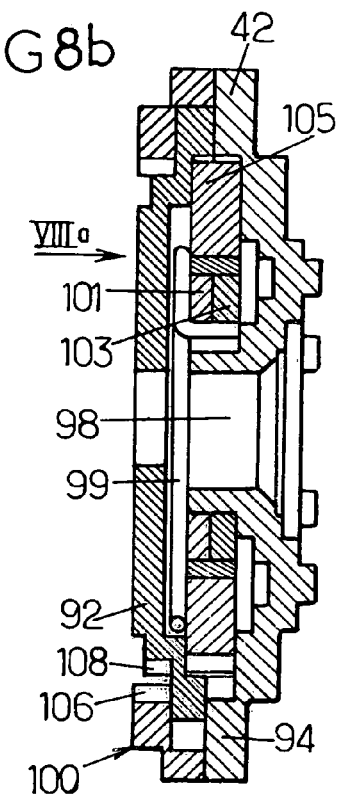
Figure 8C:
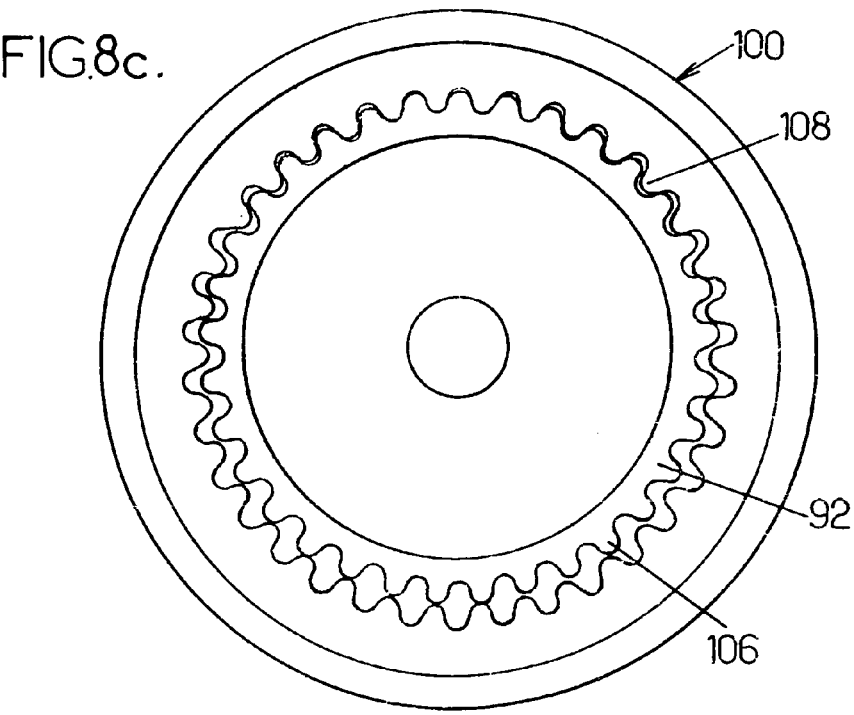

The invention may also be applied to another type of articulation, as represented in FIGS. 8a and 8b, which is an articulation as described, for example, in the patent FR-A-2 578 601, of the single-track helical type.

This articulation mechanism comprises:
 a metal mobile cheek plate 92 which has a circular shape and which extends in a plane perpendicular to the transversal axis X,
 a fixed metal cheek plate 94 which also has a circular shape and which extends parallel to the mobile cheek plate 92 and which, in the example shown, is fixedly attached to the seat part brace, the mobile cheek plate being mounted to rotate about the axis X with a nutation movement,
 a single-track helical gear 96, interposed between the first cheek plate 92 and the second cheek plate 94, inside the casing,
 a metal control shaft 98 parallel to the axis X, this shaft being fixedly attached to the control handle,
 a spring 99 which has two branches engaged simultaneously in an opening of two discs 101, 103,
 two superposed eccentric discs 101, 103 which extend parallel to the axis Z and which are mounted in rotation relative to the control shaft.

The two cheek plates 92, 94 are retained by a rigid annular gusset 100, which is superposed on one inner radial face of the annular edge 42 of the fixed cheek plate 94 and which has, in combination with the fixed cheek plate 94, a U-shaped profile that opens inwards. This profile delimits a housing which is intended to receive the mobile cheek plate 92 which can then have a rotary movement relative to the fixed cheek plate 94.

The helical gear comprises, for its part:
 a first set of gear teeth 102 which is formed on the inner face of the fixed cheek plate 94 and which is oriented radially inwards, this first set of gear teeth 102 being centred on the axis X,
 a second set of gear teeth 104 centred on an axis X' which is parallel to the axis X but which is offset relative to the latter, this set of gear teeth 104 being oriented radially outwards and having an external diameter less than the internal diameter of the first set of gear teeth 102, and the said second set of gear teeth 104 being, in the particular case considered here, formed on a metal piece 105 which is rigidly attached to the inner face of the fixed cheek plate 94.

The rotation of the shaft 98 connected to the control handle rotates the eccentric discs which themselves cause a rotation of the mobile cheek plate 92 with a nutation movement relative to the fixed cheek plate 94.

As shown in FIGS. 8a and 8b, the gusset 100 comprises a set of gear teeth 106, placed on the lower portion 53 of the gusset 100 and directed inwards. This set of gear teeth 106 interacts with a set of gear teeth 108 situated on the circumference of the mobile cheek plate 92 and directed outwards. The mobile cheek plate 92 also being driven with the set of gear teeth of the metal piece 105, the set of gear teeth of the gusset is made so as to interact with the latter.

The set of gear teeth allows a compensation of the forces, when the two sets of gear teeth engage, and thus is used to increase the strength.

The invention may also be applied to another type of articulation, described in patent EP 0 159 926, which comprises a helical planet gear mechanism which connects the mobile cheek plate to the fixed cheek plate.

This mechanism comprises a planet pinion which comprises an inner bearing which is nested on the cylindrical bearing surface of a cam, and two sets of gear teeth interacting respectively with a set of gear teeth of a fixed cheek plate and a set of gear teeth of a mobile cheek plate.

The sets of gear teeth have different diameters and one of them is centred on an axis parallel to and offset from the axis of rotation of the cam. The gusset applied to this type of articulation is similar to that described in the variants previously cited. And the various embodiments also apply to this type of articulation.

The invention claimed is:

1. Vehicle seat articulation mechanism intended to connect two elements belonging to the seat, the said articulation mechanism comprising:

first and second rigid cheek plates extending in parallel planes and intended to be attached respectively to the two seat elements, each of the first and second cheek plates comprising an inner face oriented towards the other of the first and second cheek plates and an outer Lace oriented opposite the inner face, a rigid annular gusset welded to the second cheek plate and trapping the first cheek plate against the second cheek plate, and an adjustment mechanism connecting the first and second cheek plates and suitable for allowing a relative angular adjustment between the said cheek plates, wherein the gusset is superposed on the inner face of the second cheek plate and welded against the said inner face of the second cheek plate, without covering the outer face of the second cheek plate.

2. Articulation mechanism according to claim 1, wherein the gusset is a metal piece more than 2 mm thick.

3. Articulation mechanism according to claim 1, wherein the gusset and the second cheek plate are suitable for guiding the first cheek plate in rotation.

4. Articulation mechanism according to claim 1 wherein the gusset comprises a flange which extends in a plane parallel to the cheek plates.

5. Articulation mechanism according to claim 1, wherein the first cheek plate is generally disc-shaped.

6. Articulation mechanism according to claim 1, wherein the second cheek plate comprises a disc-shaped portion.

7. Articulation mechanism according to claim 6, wherein the second cheek plate also comprises a flange which extends in a plane parallel to the disc-shaped portion.

8. Articulation mechanism according to claim 1, comprising a control member and wherein the adjustment mechanism is suitable for selectively either immobilizing or releasing the first and second cheek plates in rotation, according to actuation of the control member.

9. Articulation mechanism according to claim 1, wherein the gusset comprises at least one abutment interacting with the first cheek plate to limit the relative angular movement of the first and second cheek plates.

10. Vehicle seat articulation mechanism intended to connect two elements belonging to the seat, the said articulation mechanism comprising:

first and second rigid cheek plates extending in parallel planes and intended to be attached respectively to the two seat elements, each of the first and second cheek plates comprising an inner face oriented towards the other of the first and second cheek plates and an outer face oriented opposite the inner face, a rigid annular gusset welded to the second cheek plate and trapping the first cheek plate against the second cheek plate, and an adjustment mechanism connecting the first and second cheek plates and suitable for allowing a relative angular adjustment between the said cheek plates, wherein the gusset is superposed on the inner face of the second cheek plate and welded against the said inner face of the second cheek plate, without covering the outer face of the second cheek plate, wherein the adjustment mechanism comprises at least one gear connecting the first and second cheek plates together, the gear being controlled by an input member and being suitable for positively causing a rotation between the first and second cheek plates when the input member is actuated.

11. Articulation mechanism according to claim 10, wherein the gear connecting the first and second cheek plates together is made by means of a planet gear.

12. Articulation mechanism according to claim 10, wherein the gusset comprises a set of gear teeth oriented radially inwards and placed opposite a corresponding surface of the first cheek plate.

13. Articulation mechanism according to claim 12, wherein the first cheek plate comprises on the said corresponding surface a set of gear teeth directed radially outwards and interacting with the set of gear teeth of the gusset.

14. Vehicle seat articulation mechanism intended to connect two elements belonging to the seat, the said articulation mechanism comprising:

first and second rigid cheek plates extending in parallel planes and intended to be attached respectively to the two seat elements, each of the first and second cheek plates comprising an inner face oriented towards the other of the first and second cheek plates and an outer face oriented opposite the inner face, a rigid annular gusset welded to the second cheek plate and trapping the first cheek plate against the second cheek plate, and an adjustment mechanism connecting the first and second cheek plate and suitable for allowing a relative angular adjustment between the said check plates, wherein the gusset is superposed on the inner face of the second cheek plate and welded against the said inner face of the second cheek plate, without covering the outer face of the second cheek plate, wherein the gusset comprises a flange which extends in a plane parallel to the cheek plates, also comprising a piece made of rigid plastic covering the body of the second cheek plate and the flange.

15. Vehicle seat comprising a seat part and a back rotatively mounted relative to one another by means of at least one mechanism, the mechanism comprising:

first and second rigid cheek plates extending in parallel planes and intended to be attached respectively to the seat part and back, each of the first and second cheek plates comprising an inner face oriented towards the other of the first and second cheek plates and an outer face oriented opposite the inner face, a rigid annular gusset welded to the second cheek plate and trapping the first cheek plate against the second cheek plate, and an adjustment mechanism connecting the first and second cheek plates and suitable for allowing a relative angular adjustment between said cheek plates, wherein the gusset is superposed on the inner face of the second cheek plate and welded against the inner face of the second cheek plate, without covering the outer face of the second cheek plate.

* * * * *